United States Patent [19]

Carrigan

[11] 4,431,211
[45] Feb. 14, 1984

[54] LUGGAGE CARRIER

[76] Inventor: Richard M. Carrigan, 3538 W. Lyons, Evanston, Ill. 60203

[21] Appl. No.: 382,174

[22] Filed: May 26, 1982

Related U.S. Application Data

[63] Continuation of Ser. No. 127,798, Mar. 6, 1980, abandoned.

[51] Int. Cl.³ .............................................. B62B 1/06
[52] U.S. Cl. ................................. 280/655; 280/47.29
[58] Field of Search .................... 280/42, 47.24, 47.28, 280/47.27, 47.29, 651, 652, 654, 655, 659, 33.99 H, 33.99 R; 403/356, 319; 248/240.3, 240; 24/298, 300, 301, 318; 267/69

[56] References Cited

U.S. PATENT DOCUMENTS

| | | | |
|---|---|---|---|
| 578,444 | 3/1897 | Clagett | 24/300 X |
| 3,174,787 | 3/1965 | Kolman | 24/300 X |
| 3,712,496 | 2/1973 | Miller | 280/47.27 X |
| 3,788,659 | 1/1974 | Allen | 280/47.27 X |
| 3,998,476 | 12/1976 | Kazmark | 280/47.24 X |
| 4,037,858 | 7/1977 | Adams | 280/652 |
| 4,221,402 | 9/1980 | Kazmark | 280/655 X |
| 4,248,453 | 2/1981 | Stark | 280/655 |
| 4,294,463 | 10/1981 | Kotani | 280/655 X |

FOREIGN PATENT DOCUMENTS

| | | | |
|---|---|---|---|
| 2306653 | 11/1976 | France | 280/652 |
| 2040236 | 8/1840 | United Kingdom | 280/655 |

Primary Examiner—Robert J. Spar
Assistant Examiner—Donald W. Underwood
Attorney, Agent, or Firm—Merriam, Marshall & Bicknell

[57] ABSTRACT

A portable and collapsible carrier for transporting items of luggage, and the like, including an elongated base member having wheels at the outer ends thereof for supporting the carrier for movement over a support surface. A plurality of laterally spaced sockets are provided in the base member for receiving the lower ends of laterally spaced, upwardly extending frame portions. Spring clips having detents thereon extend through openings in the lower ends of the frame portions and secure the frame portions in the sockets. The frame portions are in sections which telescope within each other to collapse the carrier. The frame portions are held in extended positions either by an auxiliary frame member which spreads the sections or by a spring clip. One or more support frame members, which are pivotally mounted on the base member for movement between operative and inoperative positions, support items to be transported on the carrier. An elastic cord has its ends permanently connected to the support frame members for safety.

13 Claims, 22 Drawing Figures

LUGGAGE CARRIER

This is a continuation of application Ser. No. 127,798, filed Mar. 6, 1980, abandoned.

BACKGROUND OF THE INVENTION

This invention relates to luggage carriers, and more particularly relates to a portable and collapsible luggage carrier which utilizes a simplified construction resulting in reduced weight and ease of assembly without loss of strength.

Various types of collapsible luggage carriers have been heretofore developed which are particularly well suited for use by salesmen and travelers in transporting relatively lightweight loads, such as items of luggage, sample sales items and the like, for short distances. Luggage carriers of this type are particularly well suited for use by airplane passengers and personnel who must frequently carry luggage and other items for considerable distances in and around large airport terminals.

While some of the luggage carriers heretofore and presently available have proved generally satisfactory for their intended purpose, many have not, for various reasons, such as excessive weight and bulk, complexity of construction which renders them difficult to erect and collapse, and high cost.

Accordingly, it is a general object of the present invention to provide a novel and improved portable and collapsible luggage carrier which is simple in construction, strong, light in weight, easy to assemble, erect and collapse, and durable in use.

Briefly described, the luggage carrier of the present invention comprises an elongated, unitary base member having wheels rotatably mounted at the respective ends thereof. The base member is provided with a plurality of laterally spaced sockets for receiving the lower end of at least one and preferably a pair of laterally spaced, upwardly extending telescoping frame portions of an elongated frame means. The lower ends of the frame portions are secured in the base member by locking means having detents which extend through aligned openings in the lower ends of the frame portions and the walls of the sockets in the base member. The frame portions are in sections, which telescope within each other to reduce the size of the carrier when the latter is not being used. The telescoping frame sections are held in their extended positions by at least one spring clip having a detent thereon which is shiftable through openings in the frame sections when the sections are extended.

The carrier also includes support means that is pivotally mounted on the base member for pivotal movement between a forwardly extending, generally horizontal, operative position for supporting items on the carrier, and an inoperative position adjacent the upright frame portions. In one embodiment, the support means comprises a single support frame member, which pivots about a horizontal axis through the base member, and in other embodiments, the support means comprises a pair of frame members which pivot about vertically extending, laterally spaced axes through the base member.

In one embodiment, the components of the carrier are formed from a number of parts which are capable of being compactly arranged for ease of shipment and storage when the carrier is disassembled.

In all embodiments, elongated, resilient retaining means is provided to hold items on the carrier when the latter is in use, the ends of the resilient retaining means being permanently connected to the support means of the carrier in such a manner as to minimize the possibility of injury to a user in the event that the resilient retaining means accidentally disconnects from the upright frame portions.

DETAILED DESCRIPTION

Figure 1:
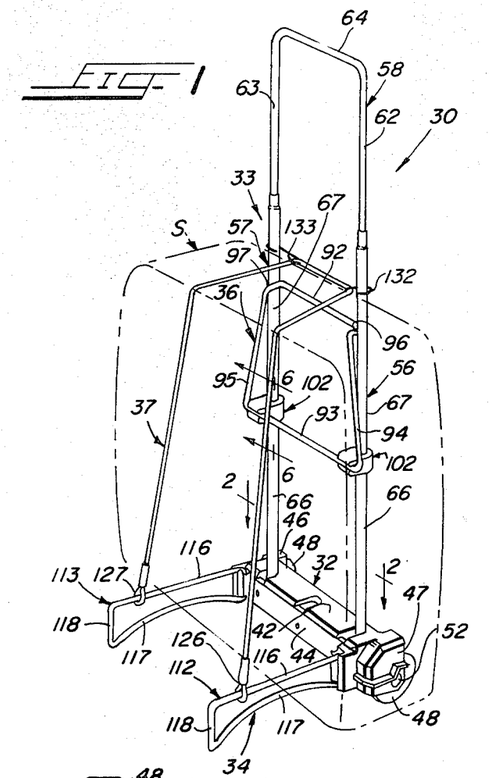
FIG. 1 is a perspective view of a portable and collapsible luggage carrier embodying the features of the present invention and showing the latter as it would appear when in use.

In FIG. 1, a portable and collapsible luggage carrier comprising a preferred embodiment of the present invention is illustrated and indicated generally at 30. The parts of the carrier 30 are shown in FIG. 1 in the positions they would occupy when the carrier is in use and supporting an article of luggage, such as a suitcase S (shown in phantom lines), on a horizontal support surface. The carrier 30 thus generally comprises an elongated base member or housing 32, elongated, upright frame means, indicated generally at 33, which extends upwardly from the base member 32, and support means, indicated generally at 34, which extends horizontally outwardly from the housing 32 when the carrier is in use for supporting one or more items on the carrier 30. The carrier 30 also includes an auxiliary frame member 36, which is pivotally mounted on the upright frame means 33, and elongated, resilient retaining means in the form of an elastic cord 37 for releasably retaining one or more items on the carrier 30 when the latter is in use.

Figures 2, 5:
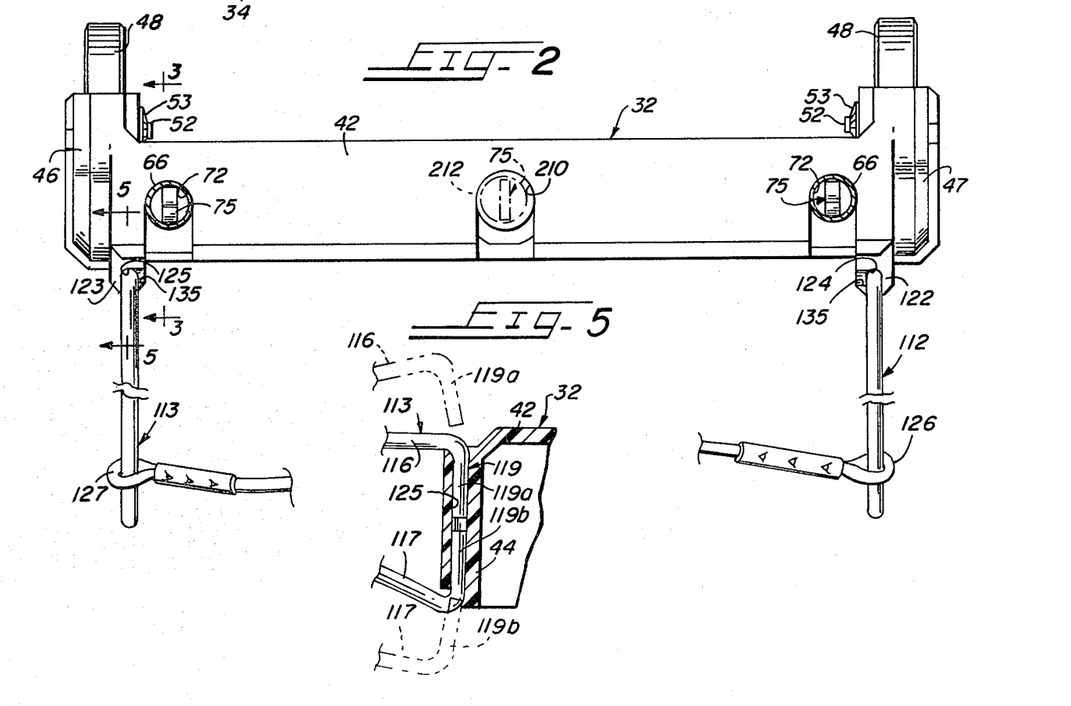
FIG. 2 is an enlarged, horizontal sectional view, with some parts in elevation, taken along the line 2—2 of FIG. 1.
FIG. 5 is a fragmentary sectional view, taken along the line 5—5 of FIG. 2, and showing the displaced positions of certain parts of the carrier in phantom lines.
Figure 3:
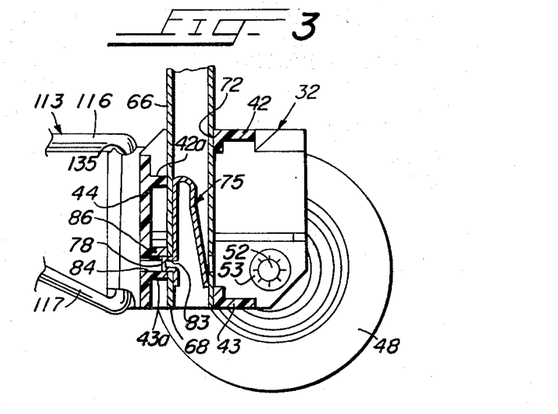
FIG. 3 is a fragmentary sectional view, with some parts in elevation, taken along the line 3—3 of FIG. 2.
Figure 4:
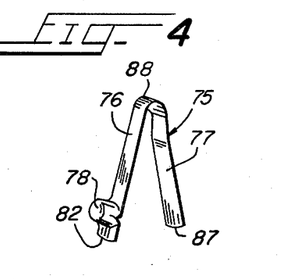
FIG. 4 is a perspective view of one of the spring clips utilized in the luggage carrier of the present invention to hold the components thereof in assembled and/or erected relation.

Referring now to FIGS. 2, 3 and 4 in conjunction with FIG. 1, it will be seen that the base member or housing 32 is elongated and U-shaped in cross section and arranged so as to have horizontally extending upper and lower walls 42 and 43, and a connecting, vertically extending wall 44. The housing 32 is preferably of a one-piece construction and, while it could be formed from various materials, it is preferably of a high impact plastic, specifically acrylonitrile butadiene styrene.

Wheel wells, indicated at 46 and 47, are provided at the laterally opposite ends of the housing 32 for partially enclosing wheels, each indicated at 48. The wheel wells 46 and 47 are preferably formed integrally with the housing 32, and are provided with axial bores (not shown) for receiving axles for the wheels 48 in the form of headed pins 52. The pins 52 are preferably retained in their bores by push nuts 53 pressed onto the protruding ends of the pins 52 after the latter have been inserted through the openings in the wells 46 and 47 and the hubs of the wheels 48.

The frame means 33 of the carrier 30 preferably comprises a pair of laterally spaced, upwardly extending portions 56 and 57, and an inverted, U-shaped handle portion 58. The handle portion 58 includes a pair of laterally spaced, vertically extending side sections 62 and 63, and a connecting, horizontally extending section 64.

The upwardly extending portions 56 and 57 of the frame means 33 are each preferably in two sections, namely, a lower tubular frame member 66 and an upper tubular frame member 67 which telescopes into the lower tubular frame member 66. The side sections 62 and 63 of the handle portion 58 likewise telescope into the upper tubular frame members 67 of the frame portions 56 and 57.

Referring now to FIGS. 2, 3 and 4, in conjunction with FIG. 1, it will be noted that the housing 32 is provided with a plurality of socket means for receiving and supporting the lower ends, indicated at 68, of the lower frame members 66 in a generally vertically extending or upright position when the carrier is resting on a horizontal surface, as illustrated in FIG. 1. Each of the aforementioned socket means is preferably circular in cross section and defined by vertically extending, circular openings, indicated at 72 in FIG. 2, which are formed in the upper and lower walls 42 and 43 of the housing, and in offset portions 42a and 43a, thereof.

According to the present invention, the lower ends of the lower frame members 66 are secured in the openings 72 by locking means when the lower ends 68 of frame members 66 are in predetermined positions in the openings 72. As best seen in FIG. 4, the aforementioned locking means may be in the form of spring clips, each indicated at 75 and being of a generally inverted, V-shaped configuration having a pair of divergent legs 76 and 77. A detent 78 is provided on the leg 76, adjacent the distal end 82 thereof, for extension through an opening 83 in the lower end of the frame section 66 and another opening 84 in a boss 86 formed in part by the offset lower wall 43a of the housing 32. Thus, when the detent 78 is positioned in the openings 83 and 84, the lower end 68 of the frame member 66 is securely retained in the housing 32. Since the distal end 82 of the leg 76 and the distal end, indicated at 87, of the leg 77, are spaced from each other by a greater distance than the internal diameter of the frame members, prior to insertion of the clip 75 in the frame members, the detent 78 is securely retained in the openings 83 and 84 due to the resiliency of the clip.

The clip 75 is easily moved into its locking position in the lower end of the frame member 66, merely be inserting the bight or apex portion, indicated at 88, of the clip into the open lower end of the frame member 66 and then continuing to shift the clip inwardly until the detent 78 seats in the aligned openings 83 and 84 in the lower frame member 66 and housing 32, respectively.

Instead of utilizing clips 75 having detents 78 to secure the lower ends 68 of the frame member 66 in the openings 72, rivets (not shown), or other fasteners, could also be employed for this purpose.

As previously mentioned, the carrier 30 includes the auxiliary frame member 36 which, in the present instance, is generally rectangular in shape and includes vertically spaced horizontally extending sections 92 and 93, and generally vertically extending side sections 94 and 95. The section 92 is connected to the side sections 94 and 95 by forwardly and rearwardly extending sections 96 and 97. The laterally outer sides of the frame sections 96 and 97 engage and slightly spread the vertically extending portions 56 and 57 of the frame means 33 to thereby lock the frame members 66 and 67, and the sections 62 and 63 of the handle portion 58, against telescoping movement when the frame member 36 is in its FIG. 1 position. When in its operative position illustrated in FIG. 1, the auxiliary frame member 36 also provides additional support for an item or items of luggage being supported on the carrier 30 and serves to strengthen the vertically extending portions 56 and 57 of the frame means 33.

Figure 8:
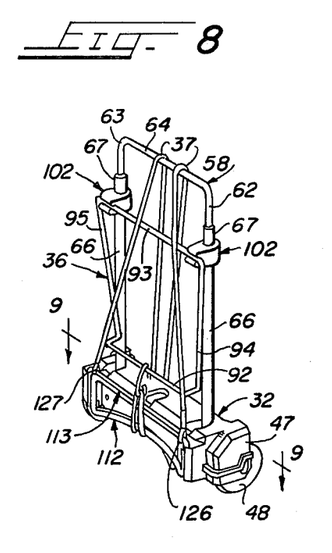
FIG. 8 is a perspective view of the carrier illustrated in FIG. 1 and showing the relationship of the parts thereof when the carrier is collapsed.

In order to permit the auxiliary frame member 36 to pivot between its operative position illustrated in FIG. 1 and an inoperative position illustrated in FIG. 8 in which the frame is pivoted downwardly about the horizontal section 93 so that the horizontal section 92 is disposed adjacent the base 32, mounting means in the form of a pair of bearing members, each indicated at 102, are mounted on the upper ends, each indicated at 104, of the lower frame members 66.

Figure 6:
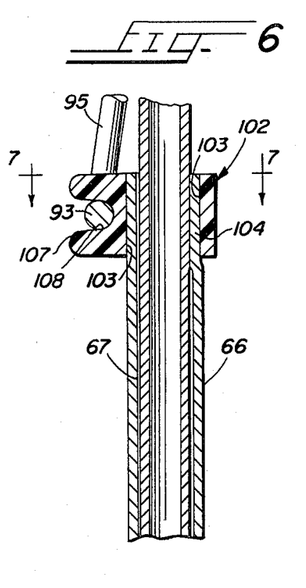
FIG. 6 is a fragmentary vertical sectional view taken along the line 6—6 of FIG. 1.
Figure 7:
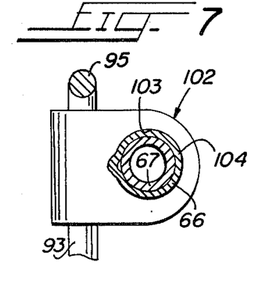
FIG. 7 is a horizontal sectional view taken along the line 7—7 of FIG. 6.

Referring now to FIGS. 6 and 7 in conjunction with FIG. 1, it will be seen that each of the bearing members 102 comprises a block of bearing material having a vertically extending bore 103 therethrough, which is sized to closely fit the upper ends 104 of the frame member 66. In order to prevent axial movement of the bearing members 102 after they have been mounted on the upper ends 104 of the frame members 66, the upper ends 104 are preferably swaged or otherwise worked so that the outer diameters thereof are less than that of the remainder of the frame members 66. Consequently, the bearing members 102 will not shift axially downwardly on the frame members 66 after the bearing members have been mounted thereon.

In order to prevent relative rotation between each bearing member 102 and its associated frame member 66, the outer periphery of the upper ends 104 of the frame members and the bores 103 in the bearing members 102 are preferably non-circular in cross section. The non-circular configuration of the upper ends 104 and bores 103 is illustrated in FIG. 7.

In order to pivotally connect the horizontal section 93 of the frame member 36 to the bearing members 102, each bearing member is provided with a horizontally extending recess 107, the inner portion of which, indicated at 108, serves as a bearing for the horizontal section 93 of the frame member 36. The inner or bearing portion 108 is of somewhat greater angular duration than half the circumference of the horizontal section 93 so that the latter is retained in the recess 107 after forced insertion therein.

While the bearing members 102 may be formed from any suitable material, they are preferably of a high impact, plastic, specifically acrylonitrile butadiene styrene.

As heretofore mentioned, the carrier 30 includes the support means 34 for supporting items thereon, such as the suitcase S. The support means 34 of the carrier 30 thus preferably comprises a pair of oblong, generally rectangular support frame members 112 and 113. Each of the support frame members 112 and 113 includes a horizontally extending upper section 116, a lower, convex, horizontally extending section 117, a vertically extending outer end section 118, and an inner, vertically extending inner end section, indicated at 119 in FIG. 5. The end section 119, in the present instance, is split so as to divide this section into two parts or portions 119a and 119b.

Figure 9:
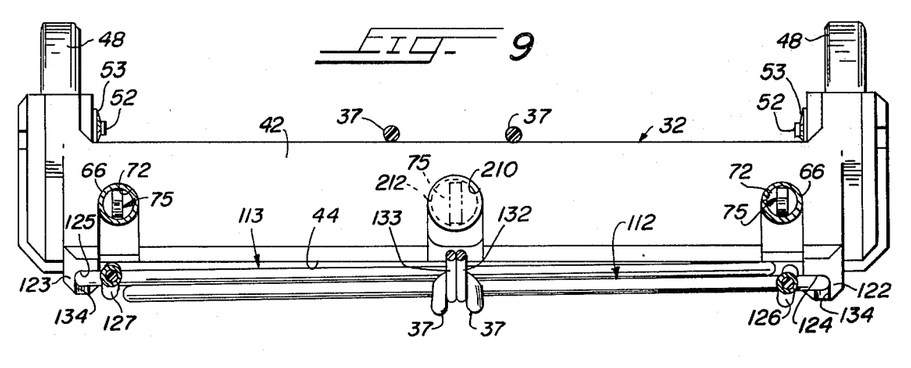
FIG. 9 is a horizontal sectional view taken along the line 9—9 of FIG. 8.

The support frame members 112 and 113 are preferably mounted for pivotal movement about their inner ends 119. To this end, the housing 32 is provided with forwardly extending bosses 122 and 123 having vertically extending bearing bores 124 and 125 therethrough, respectively. As best seen in FIG. 9, the bearing bore 124 is forwardly or outwardly offset with respect to the bearing bore 125 so that the support frame members 112 and 113 will overlap each other in juxtaposition between the bosses 122 and 123 when the frame members 112 and 113 are in their inoperative, folded positions adjacent the front wall 44 of the housing 32.

Engagement of the end portions 119a and 119b of the support frame members 112 and 113 in their respective bearing bores 124 and 125 is easily accomplished by spreading the ends 119a and 119b apart a sufficient distance to permit these ends to shift into their respective bearing bores. The approximate positions of the end portions 119a and 119b of the support frame member 113 prior to engagement in the bearing bore 125 is illustrated by the phantom line positions of the end portions 119a and 119b in FIG. 5.

In order to reduce the chances of luggage accidentally falling off of the carrier 30 when the latter is in use, the carrier 30 includes elongated, resilient retaining means in the form of an elastic cord 37. According to the present invention, the opposite ends, indicated at 126 and 127 of the cord 37 are formed into loops which encircle respective ones of the upper, horizontal sections 116 of the support frame members 112 and 113, and are shiftable thereon. Displacement of an intermediate portion of the cord 37 around an item or items resting on the support frame members 112 and 113, and attachment of the intermediate portion to the vertically extending portions 56 and 57 of the frame means 33, is facilitated by at least one and preferably a pair of hooks 132 and 133 which are slidably mounted on the cord 37. The hooks 132 and 133 may be engaged with the parts of the upright frame means 33 in any desired manner. It should be noted, however, that since the ends 126 and 127 of the cord 37 are permanently engaged with the support frame members 112 and 113, if the hooks 132 and 133 should accidentally be released by a user while attempting to connect the same to the frame portions 56 and 57, the cord 37 will snap away from the user and towards the frame members 112 and 113. Consequently, the possibility of injury to a user of the carrier 30 is substantially reduced if not entirely eliminated.

When not in use, the carrier 30 may be conveniently compacted by swinging the horizontal section 92 of the auxiliary frame member 36 forwardly and downwardly away from its engaged position with the upper frame members 67 to an inoperative position in which the horizontal section 92 of the auxiliary frame member 36 closely overlies the upper wall 42 of the housing 32, as illustrated in FIG. 8. Thereafter, the vertically extending sections 62 and 63 of the handle portion 58 may be telescoped into the upper frame members 67 and the latter telescoped into the lower frame members 66, as illustrated in FIG. 8. Prior or subsequent to this operation, the support frame members 112 and 113 may be swung into nested, juxtaposition between the bosses 122 and 123, and the elastic cord 37 may then be wrapped around the telescoped frame members as illustrated in FIG. 8. When so collapsed, the carrier 30 may be conveniently transported or stored in a small carrying bag or case until again needed.

Prior to swinging the support arms 112 and 113 from their forwardly extending operative position illustrated in FIG. 1 to their juxtaposed, inoperative position illustrated in FIG. 9, the loop 126 on the upper horizontal section 116 of the frame member 112 is shifted inwardly toward the inner or pivot end 119 of the frame member 112 and the loop 127 of the cord 37 is shifted inwardly toward the inner or pivot end 119 of the frame member 113. When so positioned, the portion of the loops 126 and 127 adjacent the housing 32 nests in the space between the front wall 44 and the adjacent ends 119 of the frame members 112 and 113, as shown in FIG. 9.

The support frame members 112 and 113 are held in their forwardly extending operative positions illustrated in FIG. 1 and in their juxtaposed, inoperative positions illustrated in FIG. 9 by grooves in the upper surfaces of their respective bosses 122 and 123. Thus, as best seen in FIG. 9, a pair of forwardly or outwardly extending grooves 134 are provided in the upper surfaces of the bosses 122 and 123 for receiving portions of the upper sections 116 of the frame members 112 and 113 when the latter are in their forwardly extending operative position. As best seen in FIG. 2, a pair of laterally extending grooves 135 are provided in the upper surfaces of the bosses 122 and 123 for receiving portions of the upper sections 116 of the frame members 112 and 113 and holding the latter in their juxtaposed, inoperative positions illustrated in FIG. 9. The resiliency of the frame members 112 and 113 causes the section 116 thereof to be biased into the grooves 134 and 135.

Figure 10:
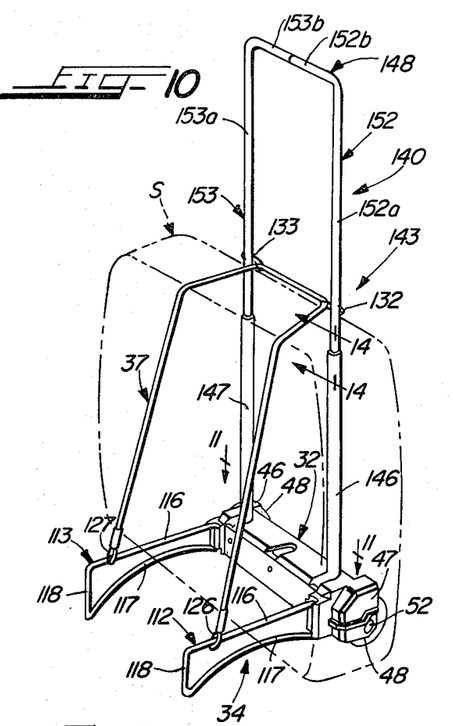
FIG. 10 is a perspective view of another portable and collapsible luggage carrier embodying the features of the present invention and showing the latter as it would appear when in use.
Figures 11, 13:
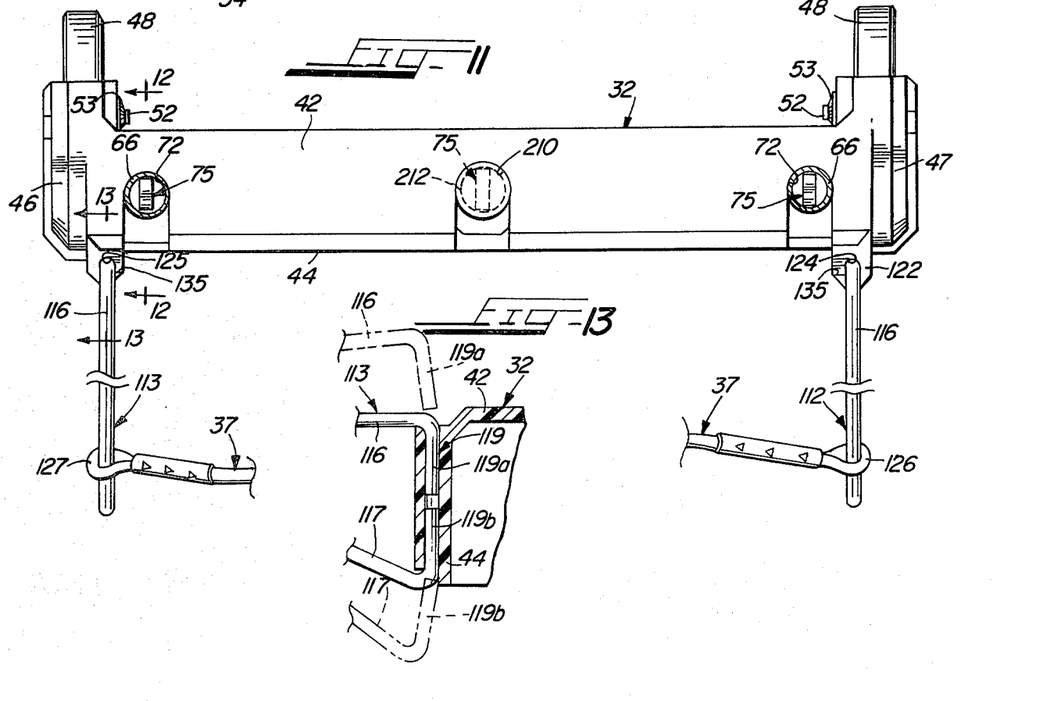
FIG. 11 is an enlarged, horizontal sectional view, with some parts in elevation, taken along the line 11—11 of FIG. 10.
FIG. 13 is a fragmentary cross sectional view taken substantially along the line 13—13 of FIG. 11 and showing the displaced positions of certain parts of the carrier in phantom lines.

Referring now to FIGS. 10-16, inclusive, and with initial reference to FIG. 10, another luggage carrier embodying the features of the present invention is illustrated and indicated generally at 140. Since the luggage carrier 140 employs many parts used in the luggage carrier 30, like reference numerals have been used to identify identical parts.

As will be apparent from FIG. 10, the carrier 140 comprises an elongated, horizontally extending base member or housing 32, elongated, upstanding frame means, indicated generally at 143, and support means, indicated generally at 34, in the form of a pair of laterally spaced, pivotally mounted support frame members 112 and 113 for supporting items mounted on the carrier 140 when the carrier is in use. Since the construction of the housing 32 and support frame members 112 and 113 of the carrier 140 are identical with those of the carrier 30, reference should be made in this specification to the description and operation of these parts of the carrier 30 for an understanding of their construction and operation in the carrier 140.

The carrier 140 likewise includes elongated, resilient retaining means in the form of an elastic cord 37 for releasably retaining an item to be transported on the carrier, such as a suitcase S, when the carrier is in use. The elastic cord 37 of the carrier 140 is connected to the support frame members 112 and 113 thereof and used in the same manner as the cord 37 of the carrier 30. Consequently, reference should be made in this specification to the description and operation of the cord 37 of the carrier 30 for an understanding of the construction, manner of attachment and use of the cord 37 of the carrier 140.

The carrier 140 differs from the carrier 30 in the construction of the upstanding frame means 143, which provides certain advantages in connection with the assembly and packaging of the carrier, as will now be described.

Figure 12:
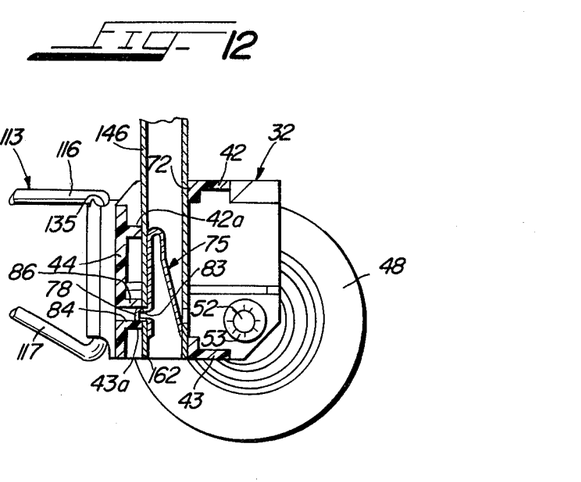
FIG. 12 is a fragmentary vertical sectional view taken substantially along the line 12—12 of FIG. 11.
Figures 14, 15:
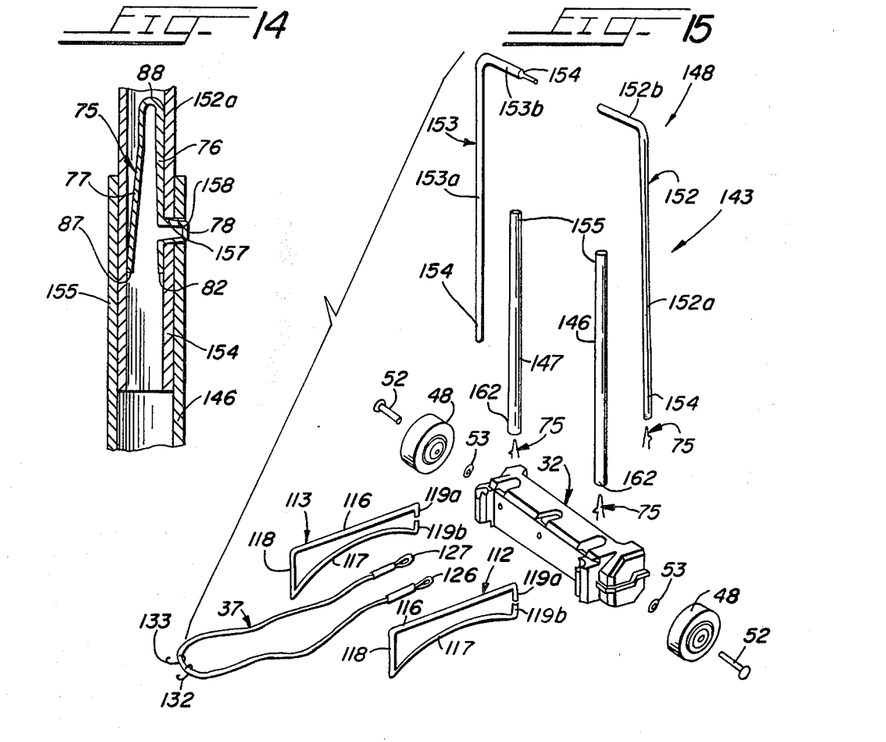
FIG. 14 is a fragmentary, vertical sectional view taken substantially along the line 14—14 of FIG. 10.
FIG. 15 is an exploded perspective view of the carrier illustrated in FIG. 10 and showing the parts of the one embodiment of the invention when disassembled.

Referring to FIGS. 12, 14 and 15 in conjunction with FIG. 10, it will be seen that the upstanding frame means 143 thereof comprises a pair of laterally spaced, vertically extending tubular members 146 and 147, and an inverted, U-shaped handle portion 148. The handle portion 148 is in two sections, namely a section 152 and a section 153, each of which includes a vertically extending portion and a horizontally extending portion. The vertically and horizontally extending portions of the handle section 152 are indicated at 152a and 152b, respectively, and the vertically and horizontally extending portions of the handle section 153 are likewise respectively indicated at 153a and 153b. The horizontal portion 153b includes a reduced diameter part 154 which is sized to fit into the interior of the horizontally extending portion 152b of the handle section 152 to provide a unitary assembly, as illustrated in FIG. 10 when the carrier is assembled.

The lower ends, indicated at 154 of the vertically extending portions 152a and 153a of the handle portion 148 fit into the upper ends, indicated at 155 of the tubular frame members 146 and 147 and are retained therein by releasable locking means in the form of at least one spring clip, indicated generally at 75. The spring clip 75 is identical to the spring clip 75 utilized in the carrier 30, and reference should be made in this specification to the description of the construction and operation of the spring clip 75 of the carrier 30 for an understanding of the construction and operation of the spring clip 75 of the carrier 140. It will suffice to say that, when it is desired to engage the handle portion with the tubular frame members 146 and 147, a spring clip 75 is inserted into the lower end 154 of the handle portion 152a until the detent 78 thereof extends through an opening 157 (FIG. 14), in the lower end 154 of the handle portion 152a. The upper end 155 of the tubular frame member 146 is likewise provided with an opening 158 (FIG. 14), through which the detent 78 extends when the openings 157 and 158 are in alignment. Thus, when the part 154 of the horizontal portion 153b is inserted into the horizontal portion 152b of the handle section 154, and when the lower ends 154 of the handle portions 152a and 153a are inserted into the upper ends 155 of the tubular frame members 146 and 147 until the detent 78 extends through the openings 157 and 158, the handle portion 148 becomes rigidly interconnected with tubular frame members 146 and 148. In other words, the spring clip 75 retains the side sections 152 and 153 of the handle portion 148 in an extended position relative to the tubular frame members 146 and 147. It will be understood that a spring clip 75 could be used to interconnect the lower end 154 of the handle portion 153a with the upper end 155 of the tubular frame member 147.

The lower ends, indicated at 162, of the frame members 146 and 147 are secured in the housing 32 in the same manner that the lower ends of the lower frame members 66 of the frame portions 56 and 57 are secured in the housing 32 of the carrier 30. Consequently, reference should be made in this specification to the description and manner of mounting of the lower ends of the lower frame members 66 for an understanding of the mounting of the lower ends 162 of the frame members 146 and 147 of the carrier 140.

As previously mentioned, the support frames 112 and 113 of the carrier 140 are of the same construction and are connected to the housing 32 in the same manner as are the support frames 112 and 113 of the carrier 30. Thus, the inner or pivot ends 119 of the frame members 112 and 113 may be engaged in their respective bearing bores 124 and 125, merely by spreading the portions 119a and 119b apart a sufficient distance to permit these portions to move into their respective bores when released. Prior to doing this, the ends 126 and 127 of the elastic cord 37 are engaged with the frame members 112 and 113, as previously described.

Figure 16:
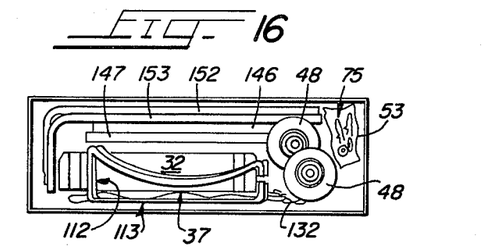
FIG. 16 is a top plan view showing the parts of the carrier illustrated in FIG. 15 as they would appear when compactly arranged in a shipping or storage box.

Since the handle portion 148 of the carrier 140 is in two pieces i.e. the sections 152 and 153, the handle sections 152 and 153, the tubular frame members 146 and 147 of the frame means 143, and the other parts of the carrier 140 can be packaged in a highly compact form for ease of storage and shipment. FIG. 16 illustrates the high degree of compactness that is possible when the parts of the carrier are packed in a shipping carton or container for storage and/or shipment.

Figure 17:
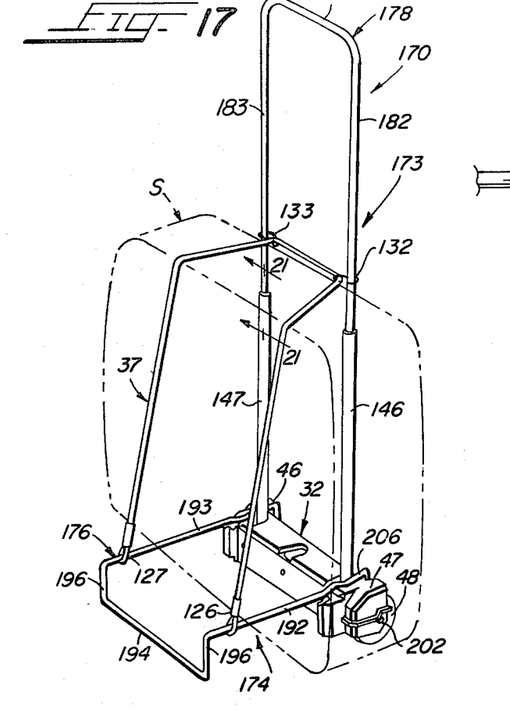
FIG. 17 is a perspective view of another portable and collapsible luggage carrier embodying the features of the present invention and showing the latter as it would appear when in use.

Referring now to FIGS. 17-22, inclusive, and with initial reference to FIG. 17, another luggage carrier embodying the features of the present invention is illustrated and indicated generally at 170. The carrier 170 utilizes some of the parts used in the carriers 30 and 140. Consequently, like reference numerals have been used to identify identical parts.

As will be apparent from FIG. 17, the carrier 170 comprises an elongated base member or housing 32, elongated, upstanding frame means, indicated generally at 173, and support means, indicated generally at 174 in the form of a generally U-shaped frame member 176 for supporting items being transported by the carrier 170 when the latter is in use. Since the construction of the housing 32 of the carrier 170 is identical with that of the previous embodiments, no further description of the housing 32 of the carrier 170 will be included.

The upright frame means 173 of the carrier 170 is of substantially the same construction as the upright frame means 143 of the carrier 140 except that the frame means 173 utilizes a one-piece handle portion, indicated generally at 178, instead of the two-piece construction employed in the handle portion 148 of the carrier 140. Thus, the handle portion 178 includes a pair of laterally spaced, vertically extending side sections 182 and 183, and a connecting, horizontally extending section 184.

The frame means 173 also includes a pair of laterally spaced, vertically extending tubular members 146 and 147, the lower ends 162 of which may be secured in the openings 72 of the housing 32, either by spring clips 75, rivets (not shown), or other fasteners. Reference should be made in this specification to the description of the mounting of the frame portions 146 and 147 in the housing 32 of the carrier 140 for an understanding of the mounting of the frame portions 146 and 147 in the housing 32 of the carrier 170.

The carrier 170 differs primarily from the previous embodiments in that only a single support frame member i.e. the support frame member 176, is utilized to support items being transported thereon and the support frame member 176 also serves as an axle for the wheels 48 of the carrier.

Figure 18:
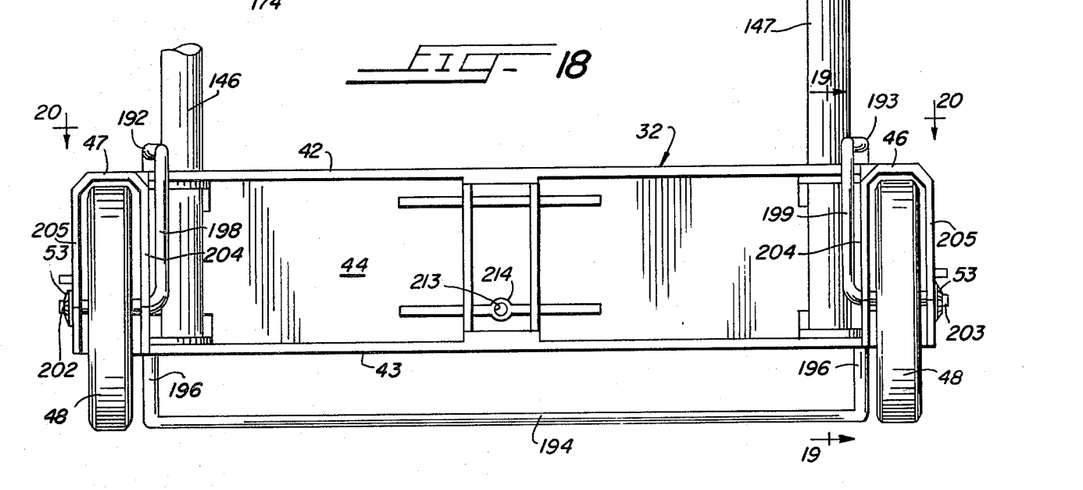
FIG. 18 is a rear elevational view of the lower portion of the carrier illustrated in FIG. 17.
Figure 19:
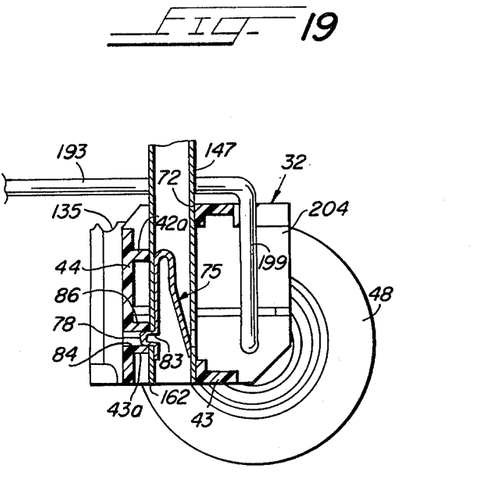
FIG. 19 is a vertical sectional view taken substantially along the line 19—19 of FIG. 18.
Figure 20:
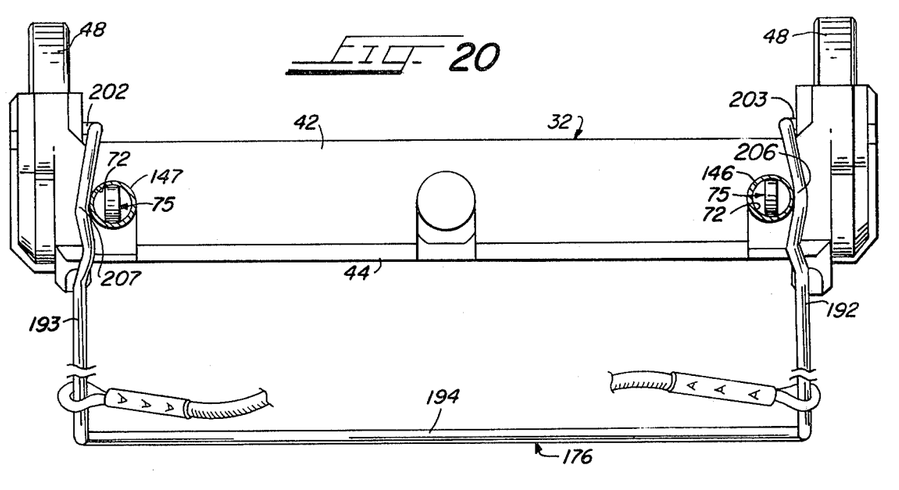
FIG. 20 is a horizontal sectional view, with portions thereof broken away, taken along the line 20—20 of FIG. 18.
Figure 21:
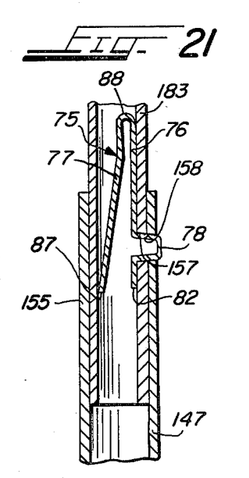
FIG. 21 is a fragmentary vertical sectional view taken along the line 21—21 of FIG. 17.

Referring now to FIGS. 18, 19 and 20 in conjunction with FIG. 17, it will be seen that the U-shaped support frame member 176 includes a pair of laterally spaced, forwardly and rearwardly extending side sections 192 and 193 and a connecting end section 194, which is offset from the plane of the laterally spaced side sections 192 and 193 by depending sections 196. Thus, when the carrier is loaded but not in use, it is supported not only by the wheels 48 of the housing 32, but also by the offset end section 194.

As best seen in FIG. 18, the laterally spaced side sections 192 and 193 of the support frame 176 extend rearwardly past the frame portions 146 and 147 and include another pair of downwardly depending portions 198 and 199, which terminate in horizontally extending end sections 202 and 203. The end sections 202 and 203 extend laterally outwardly from the depending portions 198 and 199, respectively, and are of sufficient length to extend through aligned openings (not shown) in the laterally spaced walls 204 and 205 of the wheel wells 46 and 47. The end sections 202 and 203 thus provide axles for the wheels 48 and are prevented from shifting inwardly by push nuts 53. The material of the support frame member 176 is of sufficient resilience to permit the outwardly extending or axle portions 202 and 203 to be compressed toward each other until they are aligned with the openings in the wheel wells and then permitted to expand through the openings and the hubs of the wheels 48. Compression of the sides 192 and 193 of the support frame 176 is effected when the frame is in an upwardly pivoted position, as illustrated in FIG. 22.

In order to maintain the frame 176 in its operative, forwardly extending position illustrated in FIGS. 17, 18 and 20, the side portions 192 and 193 are provided with crimps 206 and 207, respectively, for this purpose. The crimps 206 and 207 frictionally engage the outer sides of the upright frame portions 146 and 147 and releasably retain the support frame member 176 in its operative position.

Figure 22:
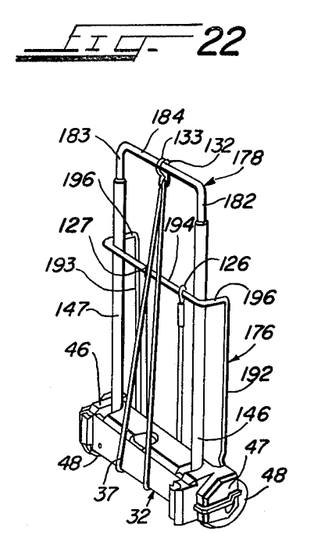
FIG. 22 is a perspective view of the carrier illustrated in FIG. 17 and showing the latter as it would appear when in an inoperative, collapsed condition.

The carrier 170 thus achieves a material and weight saving advantage in that the horizontally extending portions 202 and 203 thereof not only provide pivot axes for the frame 176 when the latter is shifted between its forwardly extending operative position illustrated in FIG. 17 and its upwardly extending, inoperative, compacted position illustrated in FIG. 22, but also provide axles for the wheels 48.

While the carriers 30 and 140 have been herein illustrated and described as utilizing a pair of laterally spaced, vertically extending frame portions 66,67 and 146,147, respectively, and generally U-shaped handle portions 58,148, respectively, a single vertically extending handle portion could also be utilized. To this end, the upper and lower horizontal walls 42 and 43 of the housings 32 of the carriers 30 and 140 are provided with a centrally located socket means in the form of vertically extending openings 210 for receiving the lower end of a single upwardly extending frame portion, indicated in phantom lines in FIGS. 2 and 11 and identified by the reference numeral 212. The frame member 212 may be secured in the housing 32 by a single spring clip 75 which extends through an opening in the lower end of the frame member and a horizontally extending opening 213 in a boss 214 on the inner side of the front wall 44 of the housing 32, as shown in FIG. 18.

While one or more embodiments of the invention have been herein illustrated and described, it will be understood that modifications and variations thereof may be developed which do not depart from the spirit of the invention and scope of the appended claims.

I claim:

1. A carrier for luggage and the like, comprising an elongated base member adapted for movement over a support surface, elongated upright frame means carried by and extending generally vertically upwardly from said base member and defining a handle for manipulating said carrier, support means including laterally spaced support frame members pivotally carried by said base member and movable between inoperative positions adjacent to one of said base member and frame means and operative positions extending generally horizontally outwardly from said base member for supporting one or more items to be transported on said carrier, and elongated resilient retaining means having an intermediate portion and opposite ends, said opposite ends being non-removably connected to respective ones of said support frame members and being freely shiftable along the lengths thereof, and at least one hook mounted on said intermediate portion of said resilient retaining means so as to be freely slidable thereon, said support frame members and said resilient retaining means coacting to support and retain one or more items to be transported on said carrier when said support frame members are in their operative positions with said item or items resting thereon and with said hook engaged with said upright frame means so that said intermediate portion of said resilient retaining means engages said item or items, the non-removable connection of said opposite ends of said resilient retaining means with said support frame members and the freely slidable mounting of said hook on said intermediate portion contributing to the safety of use of said carrier by causing said intermediate portion and hook to snap harmlessly away from a user if said intermediate portion is accidentally released while said resilient retaining means is in tension.

2. The carrier of claim 1, in which the ends of said resilient retaining means are formed into loops, and each of said loops encircles at least a portion of a respective one of said support frame members.

3. The carrier of claim 1, in which said upright frame means includes a laterally spaced pair of upwardly extending portions, and a pair of said hooks are freely slidably mounted on the intermediate portion of said elongated resilient means, said hooks being adapted to engage one or the other or respective ones of said upwardly extending portions.

4. In a carrier for luggage and the like, including an elongated base member adapted for movement over a support surface, elongated, upright frame means connected to said base member and extending generally vertically upwardly therefrom, said upright frame means including a pair of elongated, laterally spaced, upwardly extending portions, support means carried by said base member for supporting one or more items to be transported on said carrier, and an auxiliary frame member carried by said elongated, laterally spaced, upwardly extending portions of said upright frame means and movable between an operative position wherein a portion of said auxiliary frame member engages and is retained by the upwardly extending portions of said upright frame means and an inoperative position disengaged from said upright portions, said auxiliary frame member having a horizontal section about which said auxiliary frame is adapted to pivot, the improvement of at least one bearing member for pivotally connecting said auxiliary frame member to said upright frame means, said bearing member having at least one vertical bore therethrough for receiving a part of one of the laterally spaced, upwardly extending portions of said upright frame means, and said bearing member having a horizontally extending recess therein for receiving, retaining, and pivotally supporting at least a portion of the horizontal section of said auxiliary frame member, said auxiliary frame member providing additional support for one or more items on said carrier when said auxiliary frame member is in its operative position.

5. The carrier of claim 4, in which the vertical bore in said bearing member and the part of the laterally spaced, upwardly extending portion of said upright frame means which is received in said bore are non-circular in cross section.

6. The carrier of claim 5, in which said bearing member is of acrylonitrile butadiene styrene.

7. The carrier of claim 4, in which a bearing member is carried by each of the laterally spaced, upwardly extending portions of said upright frame means, and each of said bearing members has a vertical bore therethrough for receiving a part of one of the laterally spaced, upwardly extending portions of said upright frame means and a horizontally extending recess therein for receiving, retaining and pivotally supporting a portion of the horizontal section of said auxiliary frame member.

8. A carrier for luggage and the like, comprising an elongated base member adapted for movement over a support surface, elongated upright frame means carried by and extending generally vertically upwardly from said base member and defining a handle for manipulating said carrier, said base member having a pair of laterally spaced, forwardly extending bosses, a pair of elongated, generally horizontally extending support frame members mounted in said bosses for pivotal movement about laterally spaced, substantially vertically extending axes, said support frame members being movable between inoperative positions adjacent to said base member and operative positions extending generally horizontally outwardly from said base member, the lateral distance between the pivot axes of said support frame members being greater than the length of said support frame members, whereby said support frame members nest between said bosses in juxtaposition adjacent to said base member when said support frame members are in their inoperative positions.

9. The carrier of claim 8, in which said elongated, upright frame means includes at least a pair of telescoping tubular frame members, the upper end of one of said tubular frame members and the lower end of the other of said tubular frame members each has at least one opening therein, and releasable locking means is provided for releasably locking said telescoping tubular frame members in an extended position, said releasable locking means including a detent extending through said openings in said tubular frame members when the latter are in said extended position.

10. The carrier of claim 9, in which said releasable locking means comprises a spring clip insertable into one of said telescoping tubular frame members and having said detent thereon, and said detent shifts through said openings when said tubular frame members are extended to said extended positions.

11. The carrier of claim 9, in which said elongated, upright frame means includes a pair of laterally spaced, generally vertically extending tubular frame members and an inverted, generally U-shaped handle portion, said handle portion has laterally spaced, vertically extending tubular side sections and a horizontally extending section connecting the upper ends of said side sections, the side sections of said handle portion being telescopingly mounted in said tubular frame members and being movable to extended positions relative to said tubular frame members, the lower end of at least one of said tubular side sections and the upper end of at least one of said tubular frame members each having at least one opening therein, said locking means is mounted in the lower end of said one side section, and the detent of said locking means extends through said openings in said one side section and said one tubular frame member when said handle portion is in said extended position.

12. The carrier of claim 9, in which said elongated, upright frame means includes a pair of laterally spaced, generally vertically extending tubular frame members and an inverted, generally U-shaped handle portion, said handle portion has laterally spaced, vertically extending tubular side sections and a horizontally extending section connecting the upper ends of said side sections, and said horizontally extending section of said handle portion being defined by separate, horizontally extending, engaged portions.

13. The carrier of claim 8, in which the pivot axis of one of said support frame members is offset forwardly from the axis of the other of said support frame members, whereby said support frame members overlap each other when in said inoperative positions.

* * * * *